United States Patent [19]

Bohringer et al.

[11] 4,186,596
[45] Feb. 5, 1980

[54] TORQUE MEASURING ARRANGEMENT

[75] Inventors: Karl Böhringer, Stuttgart; Peter Reichle, Donaueschingen; Paul Schwerdt, Freudenstadt, all of Fed. Rep. of Germany

[73] Assignee: Daimler-Benz Aktiengesellschaft, Fed. Rep. of Germany

[21] Appl. No.: 880,107

[22] Filed: Feb. 22, 1978

[30] Foreign Application Priority Data

Feb. 26, 1977 [DE] Fed. Rep. of Germany ....... 2708484

[51] Int. Cl.² ............................................. G01L 3/10
[52] U.S. Cl. ................................................ 73/136 C
[58] Field of Search ................. 73/136 C, 133 R, 146, 73/141 A

[56] References Cited

U.S. PATENT DOCUMENTS

| 2,173,039 | 9/1939 | Muir | 73/136 C |
| 2,403,952 | 7/1946 | Ruge | 73/136 C |
| 3,728,896 | 4/1973 | Sheldon et al. | 73/136 C |
| 3,867,838 | 2/1975 | Gerresheim | 73/133 R |

FOREIGN PATENT DOCUMENTS

| 2302540 | 7/1974 | Fed. Rep. of Germany | 73/146 |
| 939175 | 10/1963 | United Kingdom | 73/136 C |
| 1284251 | 8/1972 | United Kingdom | 73/136 C |

Primary Examiner—Charles A. Ruehl
Attorney, Agent, or Firm—Craig and Antonelli

[57] ABSTRACT

A torque measuring arrangement with a rotating torque measuring member adapted to be installed into the force flow of a force transmission, which includes a deformation area to which are bonded strain gauge strips adapted to be stressed by the torque to be measured and with a rotary transmitter for the rotating line connections of the strain gauge strips with fixed line connections; the torque measuring member extends disk-shaped essentially perpendicularly to the axis of rotation while a large number of apertures of predetermined mutually identical, preferably circular contour are arranged in the torque measuring member along predetermined radial positions and uniformly distributed over the circumference; the apertures leave therebetween essentially radially extending spoke-like webs whereby the axially measured wall thickness of the torque measuring member is considerably greater at least within the area of the apertures or webs than the width of the webs measured in the circumferential direction at the narrowest location thereof; the strain gauge strips are glued onto the measuring webs eccentrically from a radial point of view.

23 Claims, 7 Drawing Figures

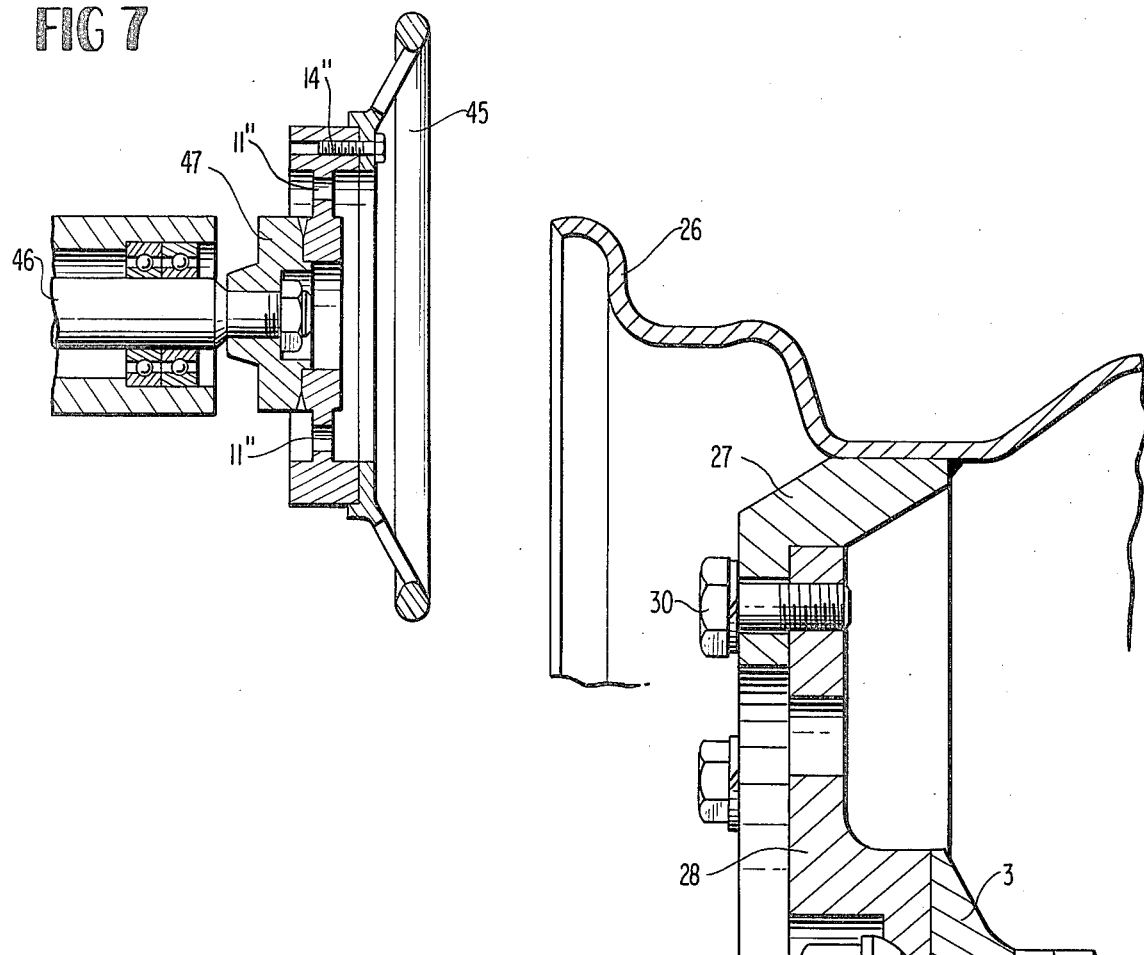
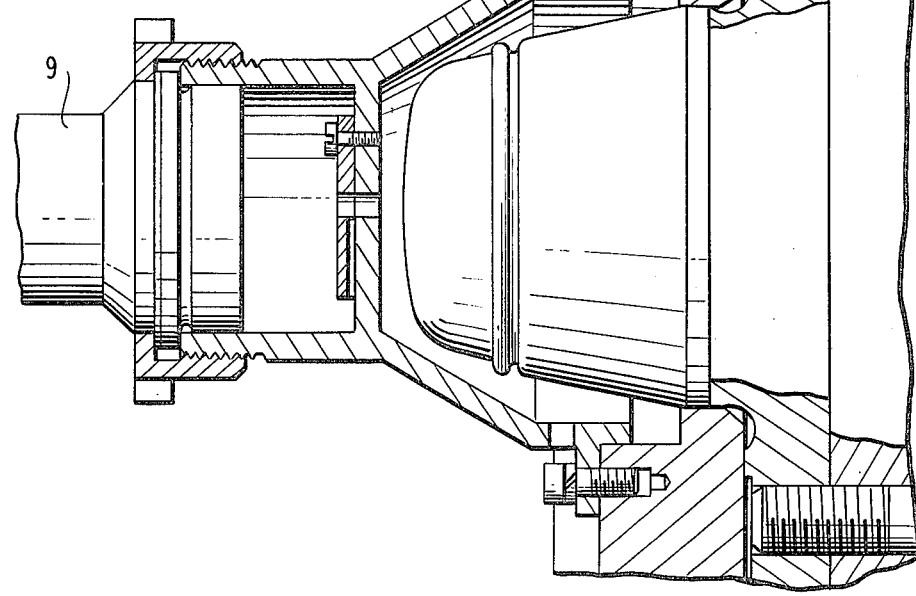

TORQUE MEASURING ARRANGEMENT

The present invention relates to a torque measuring arrangement of the type described, for example, in the German Offenlegungsschrift No. 2,501,521.

In the known torque measuring arrangement, a tubularly shaped torque measuring member with predetermined very slight wall thickness is provided as elastically stressable or loadable deformation member. The torsion of this deformation section can be determined by means of glued-on strain gauge strips; the torsion elongation serves as measure for the transmitted torque. The known measuring arrangement is provided for the determination of the steering forces at a steering hand wheel of a passenger motor vehicle. With this use, radial and axial forces have to be absorbed by the tubularly shaped torque measuring member; however, the same are controllable without damage by the torque measuring member by careful handling of the arrangement.

The radial and axial forces which act upon such a torque measuring member are determinative for the selection of the wall thickness of the torque measuring member. If these forces are very small, then the wall thickness can be kept relatively small and an intermediate bearing support of the tubularly shaped deformation member can be dispensed with for the relief of axial and radial forces. If, however, higher radial and axial forces occur, then a radial and axial support of the deformation member cannot be avoided. If one would dimension the deformation section sufficiently strong in order that it could withstand these axial and radial forces, then it would be so stiff and insensitive in the direction of rotation that the deformation member would no longer have any measuring sensitivity for torques. However, the bearing support of the deformation member in a radial and axial regard entails the disadvantage that shunts for torques occur as a result of the corresponding bearing supports which influence or falsify the torque measuring result in an uncontrollable manner.

However, an application of a torque measuring hub underlying the present invention resides in the measurement of the torque which is transmitted from a vehicle wheel of a motor vehicle. All torque shunt connections should be eliminated thereby, whence the torque measurement is to be undertaken in the hub of the wheel itself. Torque shunts by way of bearing supports for the driving axle or the cardan shaft and the differential gear are therewith eliminated. A very exact measurement of the torques exerted by way of the vehicle wheel or of the driving or deceleration forces produced thereby is particularly important for an exact reproduction of certain driving cycles on the test stand, which have to be carried out during the execution of standardized exhaust gas tests.

However, for a torque measuring installation to be built into the hub of a motor vehicle wheel it must be capable of absorbing without difficulty the axle load which falls on the respective wheel or which occurs at the respective wheel. However, no torque shunts by way of possible support bearings or the like must result thereby. Additionally, the axial or radial loads of the torque measuring installation which in part fluctuate quite strongly must not influence the torque measuring result. These requirements underlie the present invention as problems to be solved.

The underlying problems are solved according to the present invention in that the torque measuring member is essentially disk-shaped and extends essentially perpendicularly to the axis of rotation, in that a large number of apertures of predetermined mutually identical contour are arranged in the torque measuring member along predetermined radial positions, which are uniformly distributed over the circumference and which leave between themselves essentially radially extending spoke-like webs of predetermined position, shape and surface quality, in that the wall thickness of the torque measuring member—as measured in the axial direction—is at least considerably larger in the radial area of the apertures or of the webs than the width of the webs measured in the circumferential direction along the narrowest web place, and in that the strain gauge strips are glued-on eccentrically with respect to the radial direction at preferably selected measuring webs.

By reason of the spoke-like arrangement of measuring webs according to the present invention in a radially extending web rim and by reason of a quite rigid dimensioning of the webs in the axial direction yet of a bending soft construction in the direction of rotation, the torque measuring member is quite capable without any difficulty to absorb radial and axial forces in itself without requiring a separate support construction for these forces. Axially directed forces may also be absorbed without difficulty by the webs. By a suitable geometric and electrical arrangement of the strain gauge measuring strips which are bonded or glued-on to the measuring webs, the web deformations which are caused by horizontal and vertical radial forces can be eliminated. As a result thereof, only deformations of the measuring webs which are conditioned on torque are indicated toward the outside.

Accordingly, it is an object of the present invention to provide a torque measuring arrangement which avoids by simple means the aforementioned shortcomings and drawbacks encountered in the prior art.

Another object of the present invention resides in a torque measuring arrangement which is capable of absorbing axial and radial forces without the need for separate radial and axial supports.

A further object of the present invention resides in a torque measuring arrangement which is sensitive substantially only to torque while eliminating any external indications of horizontal and vertical radial forces acting on the measuring member.

Still a further object of the present invention resides in a torque measuring installation in which axial and radial forces are readily absorbed without the danger of shunt paths for the torques to be measured.

A further object of the present invention resides in a torque measuring instrument which produces very accurate measurements of the torque produced, for example, by a motor vehicle wheel.

Another object of the present invention resides in a torque measuring installation which is capable of absorbing without difficulty the axle load falling on a respective vehicle wheel without impairing the sensitivity and accuracy of the torque measurement.

These and other objects, features and advantages of the present invention will become more apparent from the following description when taken in connection with the accompanying drawing which shows, for purposes of illustration only, several embodiments in accordance with the present invention, and wherein:

FIG. 5 is an axially parallel cross-sectional view through a modified embodiment of a torque measuring arrangement in accordance with the present invention; and FIGS. 6 and 7 are somewhat schematic partial cross-sectional views illustrating two further embodiments of a torque measuring arrangement in accordance with the present invention.

Figure 1:
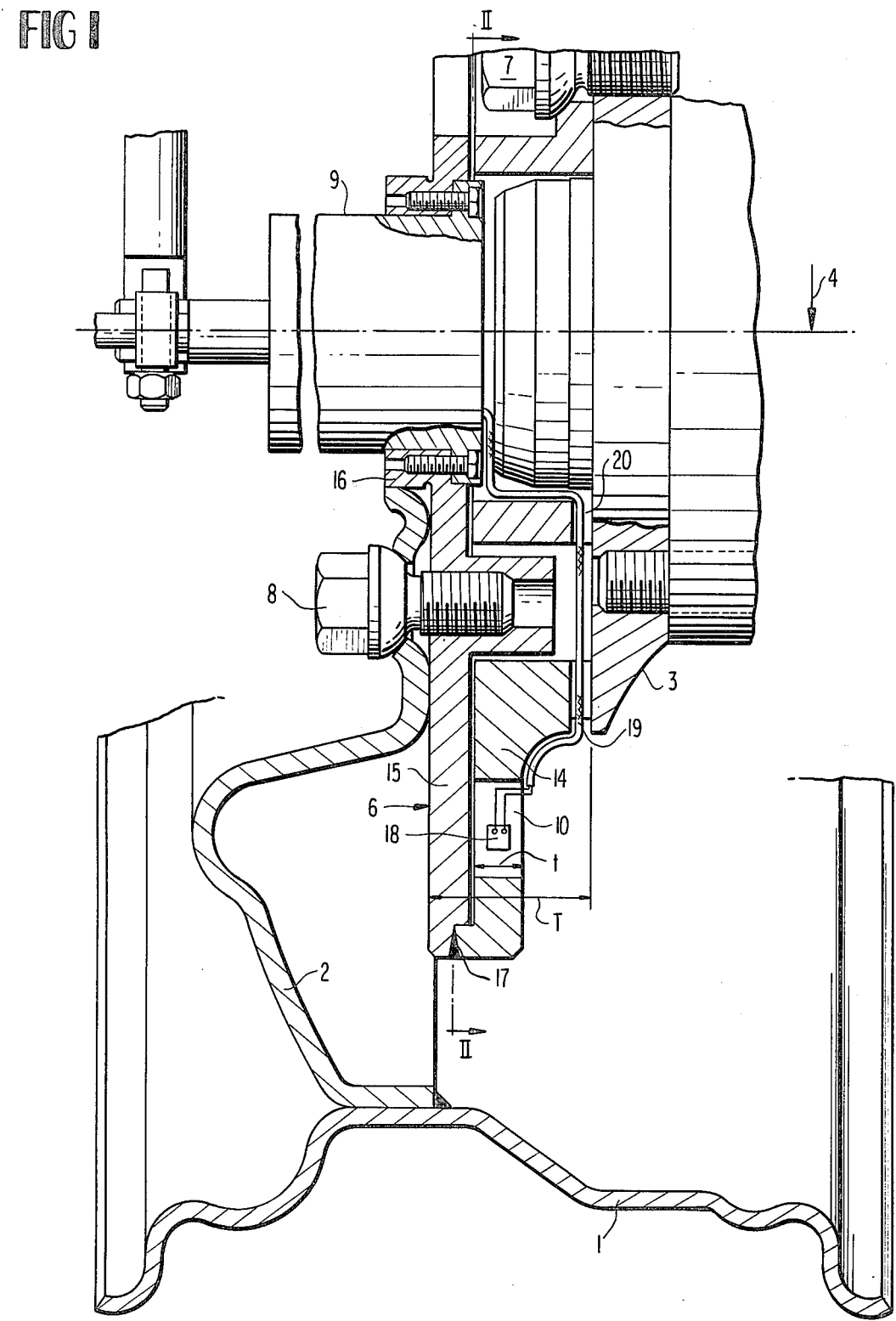
FIG. 1 is an axially parallel cross-sectional view through a torque measuring arrangement according to the present invention at a vehicle wheel.
Figure 2:
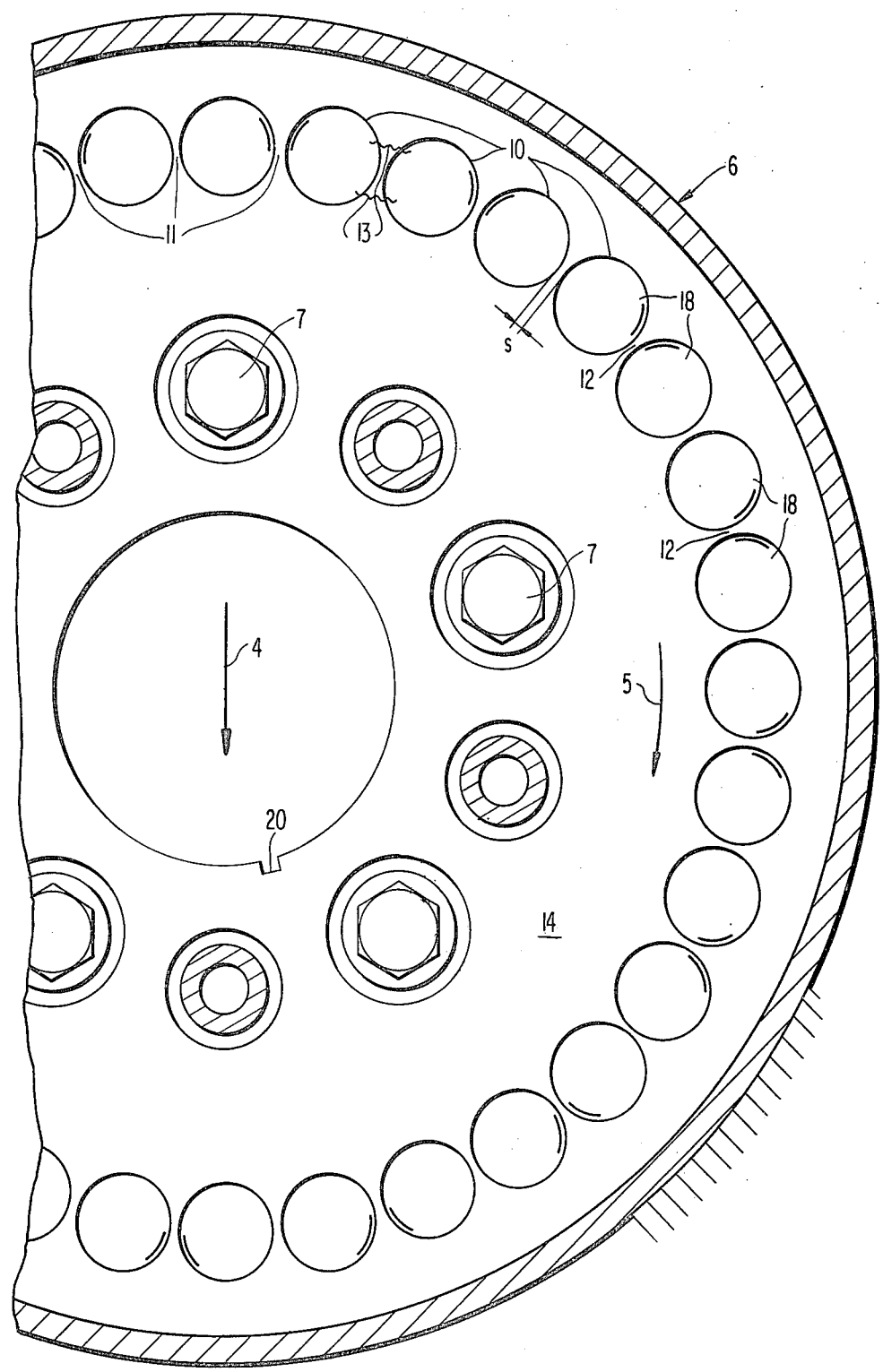
FIG. 2 is a cross-sectional view perpendicular to the axis through a torque measuring installation according to the present invention, taken along line II—II of FIG. 1.

Referring now to the drawing wherein like reference numerals are used throughout the various views to designate like parts, and more particularly to FIGS. 1 and 2, the torque measuring arrangement illustrates in FIG. 1, in the place of an entire vehicle wheel, a wheel rim 1 and a wheel disk 2 welded thereto, which under interconnection of a torque measuring disk generally designated by reference numeral 6, is connected with the driven and brakeable wheel flange 3. The torque measuring installation is loaded or stressed by the axle load 4 (FIG. 1) and by the torque 5 (FIG. 2). The interconnected torque measuring disk 6 is relatively narrow in the axial direction—dimension T (FIG. 1)—so that the track width of a vehicle axle is only insignificantly changed by the interconnection of the torque measuring disk 6. The torque measuring disk 6 is incorporated into the force flow of the torque transmission by means of two sets of bolts 7, 8. A first set of bolts 7 serves for the fastening of the measuring disk 6 at the wheel flange 3; the wheel ½ is threadably connected to the measuring disk 6 by means of the second set of bolts 8. A rotary transmitter 9 of conventional construction for transmitting the measured values from the rotating torque measuring disk 6 to a stationary connection is additionally provided on the inside of the torque measuring disk 6.

The torque measuring disk 6 consists of two disk-shaped members 14, 15 which are permanently welded together at the outer circumference by means of a welding seam 17 (FIG. 1). The measuring disk 14, properly speaking, is threadably connected with the wheel flange 3 by means of a ring of the first set of bolts 7 and carries the deformation section for measuring the torque. The other disk 15 serves for the return of the force flow from a radially relatively far outwardly disposed location to the radial place of the fastening of the wheel disk 2 to the measuring disk 14. By reason of this force flow return to the radially inwardly disposed point, it is possible to undertake torque measurements at the vehicle wheel without special rims.

The torque measuring member 14 includes inside of the deformation section a constant and predetermined wall thickness t. A ring of bores 10 with predetermined position and predetermined dimension is provided within this area. Webs 11 (FIG. 2) remain between these bores 10, which have a predetermined radial position and predetermined dimensions as also a predetermined surface quality. The cross section of these webs is considerably larger in the axial direction (dimension t in FIG. 1) than in the circumferential direction (dimension s in FIG. 2). As a result thereof, the webs 11 are capable of absorbing axial loads and stresses. In contradistinction thereto, the webs 11 are relatively soft in the circumferential direction and, as a result thereof, the deformation section is sensitive to and insulated for torques. Each second of these webs 11 is provided with a glued-on strain gauge strip 18 so these webs provided with glued-on strain gauge strips measuring webs 12. The strain gauge strips 18 are provided on both sides of the measuring webs 12 at a place of maximum stress 13. These places of maximum stress lie outside of the center of the webs 12. All of the strain gauge strips 18 are interconnected electrically into a full bridge circuit whose input and output connections are conducted through a groove 20 (connecting cable 19) to the rotary transmitter 9.

The webs are also stressed by horizontal and vertical forces perpendicular to the axis. However, the corresponding deformations of the webs which become effective on the glued-on strain gauge strips 18 can be eliminated by suitable arrangement of the strain gauge strips 18 in the measuring bridge in such a manner that only torque-conditioned deformations of the strain gauge strips 18 are indicated toward the outside. The large number of measuring webs 12 uniformly distributed over the circumference is necessary in order to obtain a torque signal in every circumferential position and above all a uniformly large measuring signal. With a lesser number of measuring webs 12, a wave shaped signal would be superimposed on the torque measuring signal, which would be produced by the passage of the measuring web 12 through the circumferential places of maximum radial load or maximum bending stress by reason of radial load. Owing to the manufacture of the webs and of the torque disk in one piece from solid material, a clamping hysteresis of any possibly clamped deformation webs is avoided.

Figure 3:
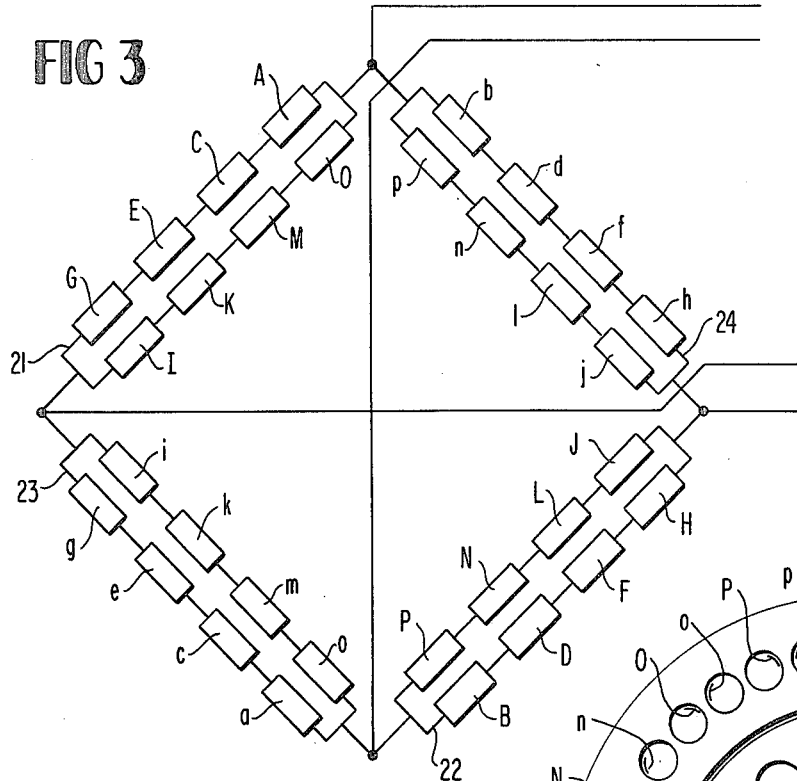
FIG. 3 is a schematic diagram indicating the electric arrangement of the used strain gauge strips in a bridge circuit according to the present invention.
Figure 4:
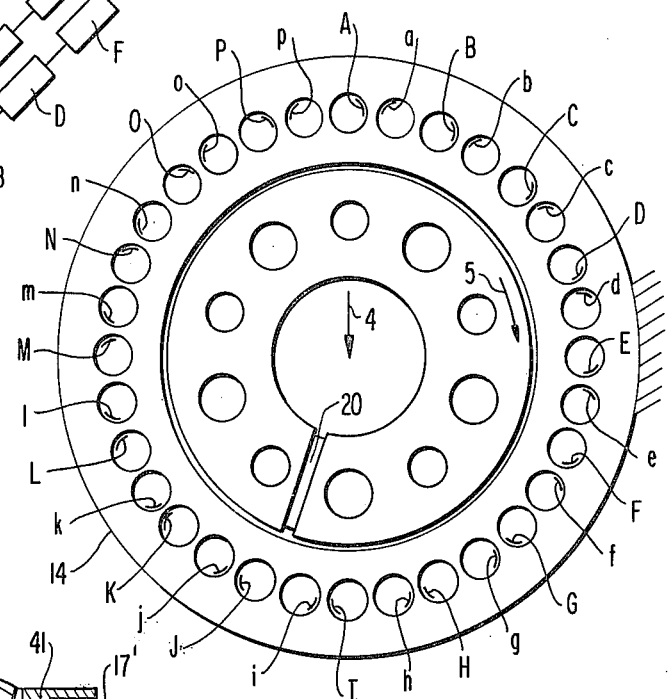
FIG. 4 is a schematic plan view on the torque measuring member in accordance with the present invention indicating the geometric arrangement of the used strain gauge strips at the torque measuring disk.

FIGS. 3 and 4 illustrate how the strain gauge strips a to p and A to P arranged at the torque measuring member 14 are to be electrically arranged in the measuring bridge illustrated in FIG. 3 in order that elongations and compressions of the webs 12 in vertical direction by reason of axial loads and therewith additionally bending of the webs 12 downwardly possibly also by reason of radial loads are eliminated. It is assumed for purposes of explanation that the outer part of the torque measuring member 14 is held fast which is to be indicated by the cross hatching provided to the right along the circumference (FIG. 2) and in that the inner part of the torque measuring member is stressed by the torque 5 in the clockwise direction. Under the assumption of this torque, the strain gauge measuring strips A–P are stretched or elongated and the strain gauge measuring strips a–p mounted on the oppositely disposed web sides are compressed. Altogether thirty-two strain gauge measuring strips are provided, of which one-half, namely sixteen strain gauge measuring strips A–P are elongated and the other sixteen strain gauge measuring strip a–p are compressed. The elongated strain gauge measuring strips A–P are to be arranged in the two tension bridge branches 21 and 22 of the measuring bridge in FIG. 3 whereas in contrast thereto the compressed strain gauge measuring strips a,p are to be arranged in the two compression bridge branches 23 and 24. Since an even number of measuring webs is involved, two measuring webs are diametrally exactly opposite one another at every circumferential place. The two measuring webs located nearest to the vertical direction will now be considered, which are provided with glued-on strain gauge strips A, a and I, i. As a result of the wheel load 4, the upper measuring web is tensioned and the lower measuring web is compressed. By reason of this influence the strain gauge strip A which is elongated by the torque influence is additionally stretched or elongated whereas in contrast thereto, the strain gauge strip I which is also stretched by the torque influence is again slightly compressed by the wheel load. In order to compensate this influence—additional elongation of the upper strain gauge strip and superimposed compression of the lower elongated strain gauge strip—these two corresponding strain gauge strips arranged at mutually opposite measuring webs are arranged in one and the same bridge branch 21 of the measuring bridge. As a result thereof, the load-conditioned resistance changes mutually cancel each other and the torque-conditioned resistance changes become effective toward the outside. One will proceed in exactly the same manner with the elongated or stretched strain gauge measuring strips of all other measuring webs and also with the compressed or shortened strain gauge measuring strips of all other measuring webs. If one now considers the two diametrally oppositely disposed measuring webs which are closest to the horizontal plane, namely the measuring webs which are provided with the glued-on strain gauge measuring strips E, e as well as M, m, it becomes apparent that these two measuring webs are bent downwardly by the wheel load 4. As a result thereof, the strain gauge strip E which is stretched or elongated as a function of torque, is additionally stretched or elongated whereas in contrast thereto, a compression is superimposed on the strain gauge strip M which is also elongated as a function of torque. The influences of the radial load 4 are therefore the same in the horizontal plane as in the vertical plane; this means the strain gauge strips elongated according to torque are additionally elongated on one side, whereas a compression is superimposed on the same on the oppositely disposed side. It is similar with the compressed strain gauge strips, only the reverse. With respect to the measuring webs extending through the horizontal plane, the same considerations therefore apply as for the measuring webs which extend through the vertical plane. This means also from the point of view of bending load of the measuring webs in the horizontal plane, similar types of strain gauge strips of diametrally oppositely disposed measuring webs must always be arranged in one and the same bridge branch of the measuring bridge. Finally, it is to be additionally noted that in each bridge branch of the measuring bridge, the entire circumference of the web rim should be uniformly represented in order that the torque signal is constant over the entire circumference of a wheel. By observing these considerations, one then obtains the distribution of the strain gauge strips illustrated in FIGS. 3 and 4. A torque measuring member equipped in such a manner supplies a torque measuring signal constant over the entire circumference, which is free of influences of the radial loads.

Another embodiment of a torque-measuring disk is shown in FIG. 5. With this torque-measuring disk 28, the return disk for the return of the force flow to the radial position of the wheel bolts 29 is not provided. In lieu thereof, a ring 27 is welded to the rim 26 as replacement for the wheel dish, at the outer circumference of which the measuring disk 28 can be secured by means of a bolt ring 30. The advantage of this construction is that the measuring arrangement is only quite insignificantly and negligibly more heavy than a normal vehicle wheel and that track changes of the two oppositely disposed vehicle wheels do not occur as a result of the installation of the measuring arrangement. This measuring arrangement is of advantage above all if torque measurements are to be undertaken under such conditions, during which greater wheel weights and track changes would become effective in a measurement falsifying manner. This could be the case above all at high velocities and/or under exploration of the road holding capacity of the vehicle.

The advantage of the torque-measuring disk according to the present invention resides in the fact that torque shunt paths are completely avoided and that driving or braking moment effective at the circumference of a vehicle wheel can be measured very accurately and without falsification. As a result thereof, for example, drive cycles for exhaust gas tests are reproducible considerably more accurately.

Figure 6:
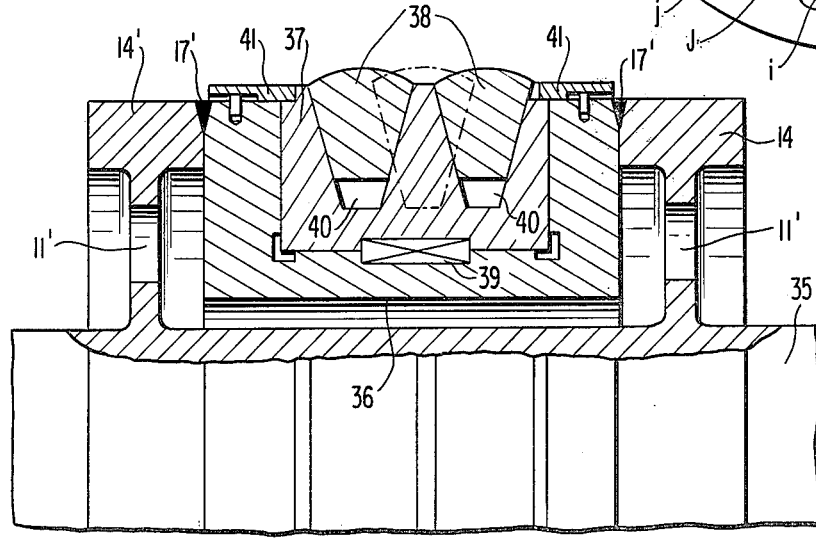

The further embodiment illustrated in FIG. 6 of a torque-measuring disk shows a tandem arrangement of measuring disks for the examination of looping drives, especially of belt drives. Two torque-measuring disks 14' machined from solid stock are arranged on a shaft 35 at predetermined axial distance, in whose disk-shaped radial parts of predetermined wall thickness a ring of bores is provided along a predetermined diameter in order to establish measuring webs 11' of predetermined position and shape. These measuring webs 11' are equipped in a conventional manner with strain gauge strips. Two half-shell-shaped connecting pieces 36 which complete into a full ring, are welded-in between the two torque-measuring disks by means of welding seams 17'; the welding seam 17' is also constructed as electron-welding seam for the avoidance of heat input. Half-shell-shaped insert members 37 are inserted as free of play as possible into a groove-shaped recess of this connecting member 36, which are secured in their radial position by sliding sleeves 41. The insert members 36 are secured in the circumferential direction by filling or adjusting springs 39. V-shaped grooves 40 are machined into the insert member 36, in which the belts 37 are able to run. The insert members 36 may have different configurations in order to be able to test and measure belts of different profile and of different type with the torque-measuring installation according to FIG. 6. By reason of the tandem arrangement of two torque-measuring disks, 14' on the one hand, the V-groove may have a relatively slight diameter—it is arranged laterally adjacent a torque-measuring disk—and on the other, the torque-measuring disk is far-reachingly relieved of canting forces by reason of the belt tension because the intermediate member 36 is supported on both sides. As to the rest, only one of the two torque-measuring disks 14' has to be equipped with strain gauge strips; however, it is necessary that with the tandem arrangement, both torque-measuring disks 14' are constructed yieldingly in the circumferential direction in a predetermined manner. With the application according to FIG. 6 for the measurement of looping drives, it may be appropriate under certain circumferences to measure also the radial force acting on the shaft by reason of a belt tension. This can take place appropriately in that the strain gauge strips are glued-on centrally at the thinnest place of the webs 11' on both sides thereof. With thus placed strain gauge strips, torque-conditioned elongations are far-reachingly eliminated.

FIG. 7 illustrates a further embodiment of the present invention. In this case a torque-measuring disk 14" having webs 11" is arranged between the hub 47 and a steering wheel 45, which hub is secured on a steering spindle 46. This torque-measuring arrangement has the advantage compared to the aforementioned arrangement according to the German Offenlegungsschrift No. 2,501,521 that the height position of the steering wheel is practically not changed by this arrangement, and in that very high radial and axial forces can be exerted on the steering wheel without thereby adducing the danger of a destruction of the torque-measuring disk. Such high axial and radial forces may be exerted on the steering wheel by the driver during the ingress into the vehicle.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A torque-measuring arrangement with a rotating torque-measuring means adapted to be installed into a force flow of a force transmission, said torque-measuring means having a deformation section which is adapted to be loaded by the torque to be measured and provided with strain gauge strip means adhesively secured thereto, characterized in that the torque-measuring means is essentially disk-shaped and extends substantially perpendicularly to an axis of rotation, a plurality of aperture means of a circular contour are arranged in the torque-measuring means at predetermined radial positions substantially uniformly distributed over a circumference thereof, said aperture means leaving therebetween essentially radially extending spoke-life webs of predetermined position, shape and surface quality, a wall thickness of the torque-measuring means, as measured in an axial direction, is considerably larger at least within an area of the webs than a width of the webs measured in a circumferential direction along a narrowest place thereof, and in that the strain gauge strip means are secured to selected webs so as to form measuring webs.

2. A measuring arrangement according to claim 1, characterized in that the strain gauge means are secured to the measuring webs eccentrically from a radial point of view.

3. A measuring arrangement according to claim 2, characterized in that the strain gauge strip means are secured at radial positions of the measuring webs at a location of highest bending stress in the measuring webs.

4. A measuring arrangement according to claim 3, characterized in that the number of said plurality of aperture means arranged in the torque-measuring means is a number divisible by eight.

5. A measuring arrangement according to claim 4, characterized in that the strain gauge strip means are secured to at least eight of said measuring webs.

6. A measuring arrangement according to claim 4, characterized in that the strain gauge strip means are secured on both sides of a respective measuring web.

7. A measuring arrangement according to claim 6, characterized in that bolt holes for fastening of the torque-measuring means in the force flow are arranged radially outwardly and radially inwardly of a ring of the webs of the torque-measuring means.

8. A measuring arrangement according to claim 7, characterized in that a second disk-shaped member is permanently connected with the torque-measuring means at a slight distance therefrom, further bolt holes are provided for fastening the second disk-shaped member to a device on which the torque is being measured, and in that the bolt holes for fastening of the torque-measuring means and the further bolt holes for fastening the second disk-shaped member are disposed at identical radial distances from the axis of rotation.

9. A measuring arrangement according to claim 6, with an even number of measuring webs equipped with strain gauge strip means, each of said measuring webs are uniformly distributed over the circumference of the torque-measuring means and are provided with one adhesively secured strain gauge strip means on both sides thereof, said strain gauge strip means being all constructed and being all arranged in substantially the same manner at respective measuring webs, characterized in that the strain gauge strip means are electrically interconnected into a full bridge circuit means.

10. A measuring arrangement according to claim 9, characterized in that all strain gauge strip means adapted to be elongated on the basis of an assumed torque to be effective in a predetermined direction are uniformly distributed into two oppositely disposed bridge branches forming tension bridge branches of the full bridge circuit means while all strain gauge strip means adapted to compressed under the assumed torque are uniformly distributed over the two remaining mutually opposite bridge branches of the full bridge circuit means disposed between the tension bridge branches and forming compression bridge branches of the full bridge circuit means.

11. A measuring arrangement according to claim 10, characterized in that a distribution of the elongated strain gauge strip means into the one or the other of the two tension bridge branches and of the compressed strain gauge strip means into the one or the other of the two compression bridge branches takes place in such a manner that a corresponding strain gauge strip means of two diametrally mutually opposite measuring webs are always arranged in the same bridge branch while a distribution of the strain gauge strip means into the two tension bridge branches and into the two compression bridge branches takes place in such a manner that the strain gauge strip means of each bridge branch are arranged uniformly distributed over the circumference of the torque-measuring means.

12. A measuring arrangement according to claim 1, characterized in that the strain gauge strip means are mounted at radial positions of the measuring webs at a location of highest bending stress in the measuring webs.

13. A measuring arrangement according to claim 1, characterized in that the number of said plurality of aperture means arranged in the torque-measuring means is a number divisible by eight.

14. A measuring arrangement according to claim 1, characterized in that the strain gauge strip means are secured to at least eight of said measuring webs.

15. A measuring arrangement according to claim 1, characterized in that the strain gauge strip means are secured on both sides of a respective measuring web.

16. A measuring arrangement according to claim 15, characterized in that the strain gauge strip means are mounted at radial positions of the measuring webs at a location of highest bending stress in the measuring webs.

17. A measuring arrangement according to claim 1, characterized in that bolt holes for fastening of the torque-measuring means in the force flow are arranged radially outwardly and radially inwardly of a ring of webs of the torque-measuring means.

18. A measuring arrangement according to claim 1, with an even number of measuring webs equipped with strain guage strip means, each of said measuring webs are uniformly distributed over the circumference of the torque-measuring means and are provided with one adhesively secured strain gauge strip means on both sides thereof, said strain gauge strip means being all identically constructed and being all arranged in substantially the same manner at respective measuring webs, characterized in that the strain gauge strip means are electrically interconnected into a full bridge circuit means.

19. A torque-measuring arrangement, with a rotating torque-measuring means adapted to be installed into a force flow of a force transmission, said torque-measuring means having a deformation section which is adapted to be loaded by the torque to be measured and provided with strain gauge strip means adhesively secured thereto, characterized in that the torque-measuring means is disk-shaped and extends substantially perpendicularly to the axis of rotation, a plurality of aperture means of a circular contour are machined in the torque-measuring means at predetermined radial positions substantially uniformly distributed over a circumference thereof, said aperture means leaving therebetween essentially radially extending spoke-like webs of predetermined position, shape and surface quality, a wall thickness of the torque-measuring means, as measured in an axial direction, is considerably larger at least within an area of the webs than a width of the webs measured in a circumferential direction along a narrowest place thereof, and in that strain gauge strip means are secured to the measuring webs eccentrically radially outwardly with respect to the narrowest width of the webs.

20. A torque-measuring arrangement with a rotating torque-measuring means adapted to be installed into a force flow of a force transmission, said torque-measuring means having a deformation secution which is adapted to be loaded by the torque to be measured and be provided with strain gauge strip means adhesively secured thereto, characterized in that the torque-measuring means is disk-shaped and extends substantially perpendicularly to an axis of rotation, a plurality of aperture means of circular contour are arranged in the torque-measuring means at predetermined radial positions substantially uniformly distributed over a circumference thereof, said aperture means leaving therebetween essentially radially extending spoke-like webs of predetermined position, shape and surface quality, a wall thickness of the torque-measuring means, as measured in an axial direction, is considerably larger at least within an area of the webs than a width of the webs measured in a circumferential direction along a narrowest place thereof, and in that strain gauge strip means are secured to the measuring webs eccentrically radially outwardly with respect to the narrowest width of the webs on both sides of a respective measuring web.

21. A torque-measuring arrangement with a rotating torque-measuring means adapted to be installed into a force flow of a force transmission, said torque-measuring means having a deformation section which is adapted to be loaded by the torque to be measured and provided with strain gauge strip means adhesively secured thereto, characterized in that the torque-measuring means is essentially disk-shaped and extends substantially perpendicularly to the axis of rotation, a plurality of aperture means of predetermined contour are arranged in the torque-measuring means at predetermined radial positions substantially uniformly distributed about a circumference thereof, said aperture means leaving therebetween essentially radially extending spoke-like webs of predetermined position, shape and surface quality, a wall thickness of the torque-measuring means, as measured in an axial direction, is considerably larger at least within an area of the webs than a width of the webs measured in a circumferential direction along a narrowest place thereof, the strain gauge strip means are secured to selected webs so as to form measuring webs, first bolt holes are provided for fastening of the torque-measuring means in the force flow, the first bolt holes are arranged radially outwardly and radially inwardly of a ring of the webs of the torque measuring means, a second disk-shaped member is permanently connected with the torque-measuring means at a slight distance therefrom, second bolts holes are provided for fastening the second disk-shaped member to a device on which the torque is being measured, and in that the first bolt holes for fastening of the torque-measuring means and the second bolt holes for fastening the second disk-shaped member are disposed at identical radial distances from the axis of rotation.

22. A torque-measuring arrangement with a rotating torque-measuring means adapted to be installed into a force flow of a force transmission, said torque-measuring means having a deformation section which is adapted to be loaded by the torque to be measured and provided with strain gauge strip means adhesively secured thereto, characterized in that the torque-measuring means is disk-shaped and extends substantially perpendicularly to an axis of rotation, a plurality of aperture means of predetermined contour are arranged in the torque-measuring means at predetermined radial positions substantially uniformly distributed over a circumference thereof, said aperture means leaving therebetween essentially radially extending spoke-like webs of predetermined position, shape and surface quality, a wall thickness of the torque-measuring means, as measured in an axial directed, is considerably larger at least within an area of the webs than a width of the webs measured in a circumferential direction along a narrowest place thereof, strain gauge strip means are secured on selected webs so as to form measuring webs, an even number of measuring webs are equipped with the strain gauge strip means, each of said measuring webs are uniformly distributed over the circumference of the torque-measuring means and are provided with one adhesively secured strain gauge strip means on both sides thereof, said strain gauge strip means being all constructed identical and being all arranged in substantially the same manner at the respective measuring webs, the strain gauge strip means are electrically interconnected into a full bridge circuit means, and in that all strain gauge strip means adapted to be elongated on the basis of an assumed torque to be effective in a predetermined direction are uniformly distributed into two oppositely disposed bridge branches forming tension bridge branches of the full bridge circuit means while all strain gauge strip means adapted to be compressed under the assumed torque are uniformly distributed over the two remaining mutually opposite bridge branches of the full bridge circuit means disposed between the tension bridge branches and forming compression bridge branches of the full bridge circuit means.

23. A measuring arrangement according to claim 22, characterized in that a distribution of the elongated strain gauge strip means into the one or the other of the two tension bridge branches and of the compressed strain gauge strip means into the one or the other of the two compression bridge branches takes place in such a manner that a corresponding strain gauge strip means of two diametrally mutually opposite measuring webs are always arranged in the same bridge branch while a distribution of the strain gauge strip means into the two tension bridge branches and into the two compression bridge branches takes place in such a manner that the strain gauge strip means of each bridge branch are arranged uniformly distributed over the circumference of the torque-measuring means.

* * * * *